Aug. 3, 1954 W. C. OHLSSON 2,685,248
PRESSURE BREWING APPARATUS FOR HOT BEVERAGES
Filed April 13, 1951 3 Sheets-Sheet 1

Inventor:
Waldemar Clarence Ohlsson
By Jarvis Marble
his attorney

Aug. 3, 1954   W. C. OHLSSON   2,685,248
PRESSURE BREWING APPARATUS FOR HOT BEVERAGES
Filed April 13, 1951   3 Sheets-Sheet 3

Patented Aug. 3, 1954

2,685,248

UNITED STATES PATENT OFFICE 2,685,248

PRESSURE BREWING APPARATUS FOR HOT BEVERAGES

Waldemar Clarence Ohlsson, Drottningholm, near Stockholm, Sweden, assignor to Aktiebolaget Amerika-Matts, Falun, Sweden, a corporation of Sweden Application April 13, 1951, Serial No. 220,758

Claims priority, application Sweden April 15, 1950

5 Claims. (Cl. 99—303)

My invention relates to a pressure brewing apparatus for hot beverages, comprising a kettle open at its top, a riser tube for the passage of a steam and water mixture generated in said kettle to a receptacle adapted to receive an extractible powder and placed over said kettle on a shoulder projecting inwardly from the upper edge of the kettle, and a collecting vessel detachably connected with the kettle and communicating with the interior of the receptacle through a second riser tube extending upwardly from the bottom of the vessel.

In brewing apparatus of this type, the sealing problem presents great difficulties. The powder in the receptacle offers considerable resistance to the passage of the steam and water mixture. Such resistance becomes still greater when according to modern embodiments the steam and water mixture is forced to pass through the receptacle along the whole width thereof in order to make the extraction more effective. Instead of passing through the receptacle, the steam and water mixture tries to escape at the joint between the kettle and the collecting vessel. To counteract this leakage, the connection between said parts of the apparatus had to include a packing clamped in under a strong pressure produced by an eccentric device or by means of screws. This sealing has proved not to be effective enough, though it makes the operation of the apparatus difficult while its manufacture becomes rather expensive.

One object of my invention is to eliminate these drawbacks by providing a pressure brewing apparatus of the type set forth, wherein the seal between the kettle and the collecting vessel is brought about by novel means, so as to render unnecessary the powerful compression members for the parts in question.

A further object of my invention is to provide a pressure brewing apparatus, the collecting vessel of which may be made from a material particularly suitable for this purpose, such as porcelain, faience or enamelled sheet-metal, which materials could not previously be used, since they can not stand the strains caused by a powerful compression.

A still further object of my invention is to provide a pressure brewing apparatus with the least possible number of separate parts.

Further objects and advantages of the invention will be apparent from the following description considered in connection with the accompanying drawings, which form a part of this specification, and of which:

Figure 1:
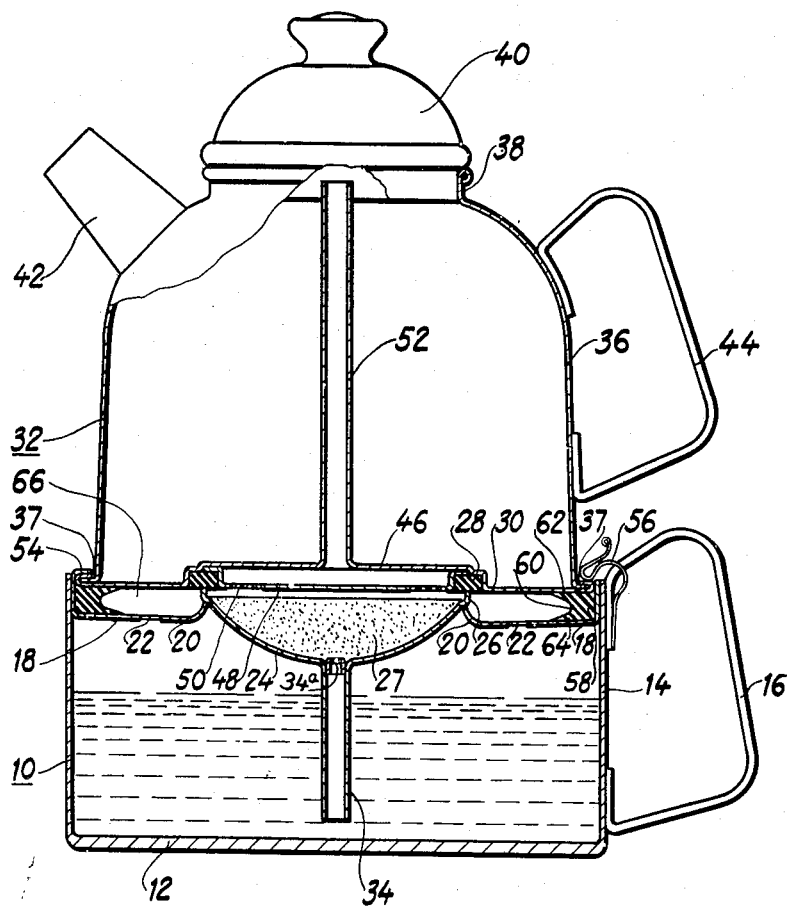
Fig. 1 is a partly sectioned elevation of a brewing apparatus constructed according to a first embodiment of my invention.

Referring to the drawings, 10 generally designates a steam generating container or kettle, preferably of sheet-metal with preferably flat-ground thick bottom 12 and a cylindrical lateral wall 14, to which may be secured a handle 16. The kettle is open at the top. Secured about the upper edge portion of said kettle is an inwardly projecting shoulder 18, the free edge portion 20 of which is bent upwardly. The shoulder 18 is provided with apertures 22. The free edge portion 20 constitutes a seat for a receptacle 24 for the pulverulent substance 27 out of which the beverage is to be produced. Said receptacle rests with an annular shoulder 26 on the seat while extending with its upper free edge seating upwardly against a packing 28 in the bottom 30 of a collecting vessel denoted generally by 32 covering the kettle 10 and preferably shaped as a flat bowl open at the top. Connected centrally to said receptacle is a riser tube 34 extending from a strainer element 34a downwardly to the proximity of the bottom 12 of the kettle 10. The collecting vessel 32 may have the form of an ordinary coffee-kettle made for instance of aluminium plate and provided with a cylindrical side wall 36, a cylindrical lid attachment 38, a lid 40, an outlet spout 42, and a handle 44. The bottom 30 of the collecting vessel is secured at 37 to the side wall 36 by folding. Said bottom has a central recess 46 with a strainer element 48 secured therein and provided with perforations 50, preferably only in the vicinity of the peripheral portion. A riser tube 52 extends upwardly from the center of said recess to near the lid 40. The above-mentioned packing 28 is secured between the strainer element 48 and the outer edge of the bottom portion 46.

In the embodiment illustrated in Fig. 1, the collecting vessel 32 is secured to the kettle 10 by a portion of the bottom fold 37 being introduced underneath a boss 54 formed at the shoulder 18, the diametrically opposed portion of the bottom fold thereafter being clamped underneath a spring snap member 56 or other suitable clamping device provided at the side wall 14 of the kettle 10. The peripheral edge portion of the collecting vessel rests on an annular packing 58, for instance of rubber, said packing bearing on the outer peripheral portion of the shoulder 18 while having an annular recess 60 at the inner circumference formed between an upper and a lower inwardly projecting flange portions 62 and 64, respectively. The upper free edge of the annular shoulder of the receptacle element 24 bearing against the packing 28, an annular space 66 is formed between the shoulder 18 and the bottom 30, said annular space being in open communication with the interior of the kettle 10 through the apertures 22.

The device operates in the following manner: After the receptacle 24 with powder therein, such as coffee powder, and the collecting vessel 32 have been assembled with the kettle 10 filled with an adequate quantity of water, the water is brought to boil and the annular space 66 will be filled with steam. This steam forces the flanges of the packing 58 away from one another and at the same time forces the packing against the faces formed by the walls of the shoulder and the bottom 30 of the collecting vessel 32. A perfect sealing effect is obtained between the kettle and the collecting vessel. Since the packing 28 seals the annular space 66 against the space above the receptacle 24 and the riser tube 52, the steam and water mixture generated in the kettle finds no path other than through the riser tube 34 up to the receptacle 24, where said mixture passes through the powder to subject the same to extraction. When the steam and water mixture enters the receptacle from below through the central strainer 34a and can escape only through the peripheral openings 50 in the strainer element 48, it is compelled to pass through the powder over the entire area thereof, whereby complete extraction is ensured. From the openings 50 the extract is then forced by the steam pressure from the kettle 10 up through the riser tube 52 and from the latter into the interior of the collecting vessel 32. Since the resistance of the powder in the receptacle 24 is comparatively great, the steam and water mixture would try to find its way out at the joint between the kettle and the collecting vessel, if the deformation of the packing 58 between the shoulder 18 of the kettle and the bottom 30 of the collecting vessel did not provide for the perfect sealing effect. Due to this effect the mechanical connection between the kettle and the collecting vessel has only to prevent the steam pressure from lifting the collecting vessel off the kettle, whereas said connection need not be designed to overcome a sealing problem, and consequently it can be made much simpler than prior brewing apparatus.

Figure 2:
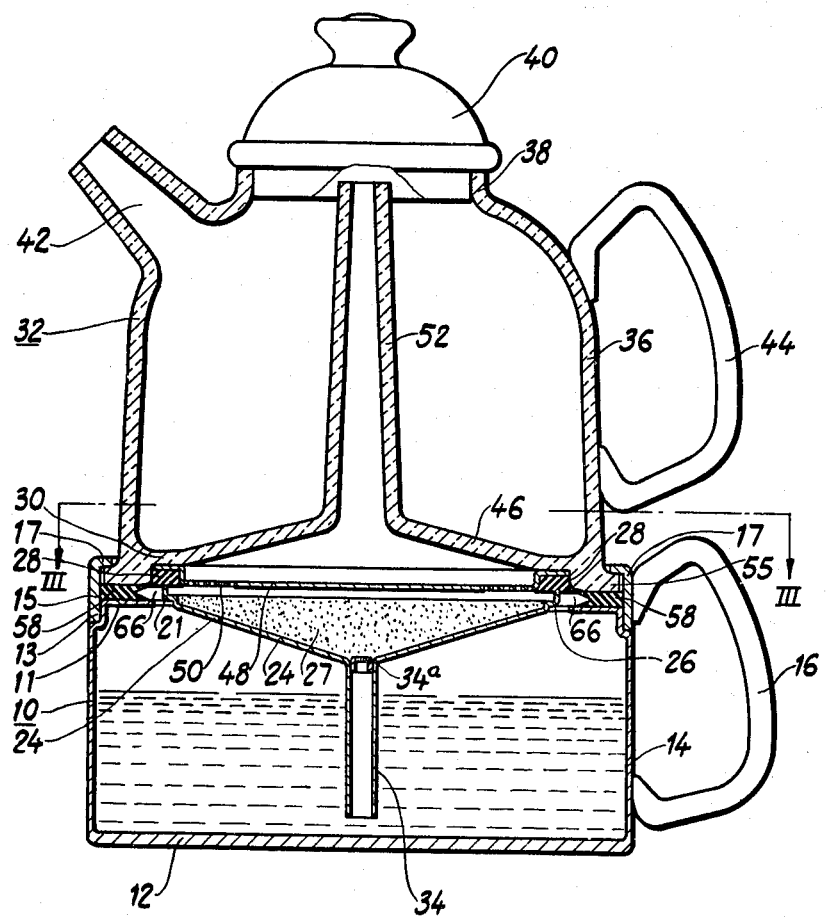
Fig. 2 is a partly sectioned elevation of a brewing apparatus constructed according to a second embodiment.
Figure 3:
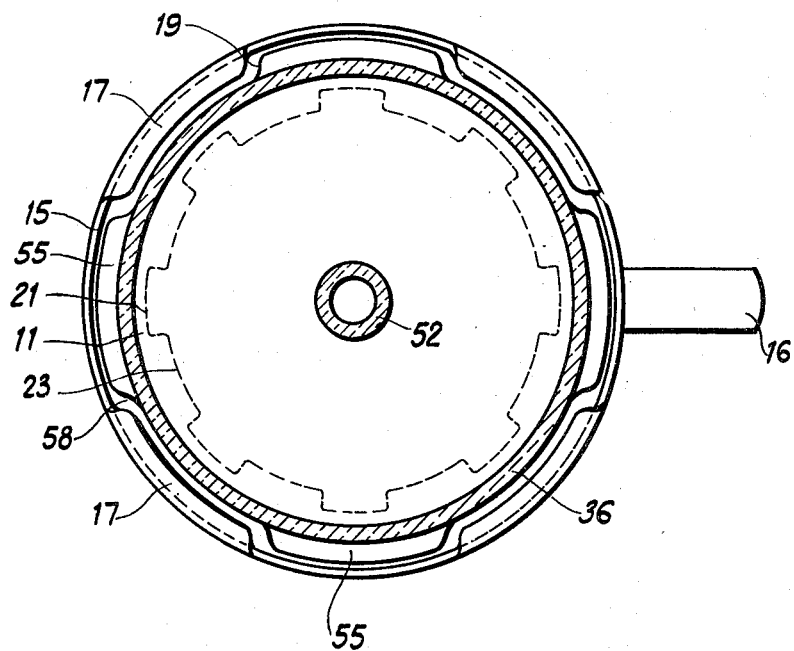
Fig. 3 is a cross section on line III—III of Fig. 2, the upper part of the apparatus being angularly displaced by 45° relative to the lower part, as compared with Fig. 2.

The connection between the kettle and the collecting vessel may alternatively be constituted by the means shown in Figs. 2 and 3, which makes it possible to manufacture the whole collecting vessel from materials particularly suitable for preserving the aroma of brewed beverages but which, however, do not have the mechanical strength required to withstand pressures of the magnitude previously required in apparatus of the type under consideration. Such materials are for example porcelain, faience and enamelled sheet-metal. In the embodiment illustrated in said figures, the edge portion of the upwardly open kettle 10 is bent into an inwardly projecting shoulder 11, the free edge of which has recesses 21 regularly distributed along the peripheral portion thereof, said recesses having between them inwardly projecting tongues 23. These tongues constitute the seat for the receptacle 24 receiving the extractible powder 27. The annular shoulder 26 of the receptacle 24 rests, as shown in the embodiment illustrated in Fig. 1, on the inner free edge portion of the shoulder 11, such edge portion being represented in the present case by the tongues 23, whereas, when the receptacle 24 takes the position shown in Fig. 2, the non-covered portions of the recesses 21 correspond to the apertures 22 in the shoulder 18 in the embodiment of Fig. 1.

At the transition between the side wall 14 and the shoulder 11 is a shoulder 13 receiving the lower edge portion of a ring 15 provided with inwardly bent lugs 17 at its upper edge located at a distance above the shoulder 11. These lugs, four in number, for example, are uniformly distributed around the ring 15 and leave between them open portions 19 of a somewhat greater peripheral extent than that of the lugs 17. A handle 16 may be attached to the ring 15 and the side wall 14.

Also, in the embodiment illustrated in Figs. 2 and 3, the collecting vessel 32 is shaped as a detachable coffee kettle with a side wall 36, a lid attachment 38, a lid 40, an outlet spout 42, and a handle 44, and is provided with a collecting tube 52 projecting upwardly from the recessed bottom portion 46. A few structural differences are necessitated by the nature of its material, such as ceramic or glass. Its bottom, therefore, emerges with said side wall 36 to form an integral body. The recessed central bottom portion is preferably dimensioned so that the packing 28 will be forced against the lateral edge of said bottom portion with the aid of the strainer element 48 secured to said edge and thus covering the receptacle 24 from the packing 28 bearing tightly against the free upper edge thereof. The bottom of the collecting vessel is provided at the outer edge with projections 55 corresponding in number and shape to the lugs 17 on the ring 15 and to the open portions 19 between said lugs so as to render possible entering of the projections 55 between the lugs 17 and to cause them, by a rotary movement of the collecting vessel 32 relatively to the kettle 10, to engage underneath said lugs. The annular packing 58 between the shoulder 11 of the kettle and that portion of the bottom of the collecting vessel which extends from the projections 55 to the outer border of the recessed middle portion 46 constitutes the outer limit of the annular space 66 communicating with the interior of the kettle 10 over the recesses 21. Steam generated in the kettle 10 enters the annular space 66 through the recesses 21 and acts upon the packing 58 in the same manner as in the embodiment shown in Fig. 1, the fluid tight sealing being provided between the kettle 10 and the collecting vessel 32. Since the packing 28 prevents the steam from penetrating from the annular space 66 into the free space above the receptacle 24 and out through the riser tube 52, the steam and water mixture is forced up through the riser tube 34 and through the extractible powder 27 in the receptacle 24. It will be understood that the projections 55 have for their only object the anchoring of the collecting vessel under the lugs 17 so that the steam pressure cannot raise the collecting vessel off the kettle. There is no need of any clamping of the projections to provide for a perfect sealing effect, inasmuch as this latter object, in accordance with this invention, is attained by the deformable annular packing 58 in conjunction with the annular space 66 and its other packing 28. For this reason the projections 55 may also be made from the same ceramic material as the remainder of the collecting vessel, whereby the manufacturing costs of the apparatus are considerably reduced while the operation of the same is simplified still further. The lugs 17 or the projections 55 may have stops in the form of slightly impeding oblique surfaces. These have for their object only the prevention of too great a relative movement between the kettle and the collecting vessel, without pressing them against each other in the manner which is characteristic, for instance, of bayonet-joints, of which the present construction can be considered an example.

While several more or less specific embodiments of the invention have been shown, it is to be understood that this is for purpose of illustration only, and the invention is not to be limited thereby, but its scope is to be determined by the appended claims.

What I claim is:

1. Apparatus of the character described comprising a lower generating vessel adapted to contain a liquid and to generate therefrom vaporous fluid under pressure, an intermediate vessel adapted to contain material to be treated by such fluid generated in said lower vessel, an upper collecting vessel for collecting fluid forced by said pressure through said material, mechanical means for detachably assembling said vessels with said intermediate vessel interposed between said lower and upper vessels with the material to be treated situated in the path of flow of fluid from the lower vessel to the upper vessel, whereby to provide resistance to such flow, means providing two peripherally continuous packing means spaced from each other and comprising a first packing between said lower vessel and said upper vessel and a second packing between said upper vessel and said intermediate vessel, there being a space located between said packings and in fluid pressure transmitting communication with the interior of said lower vessel, said space being subject to fluid pressure created by the generation of vaporous fluid in said lower vessel and the resistance to flow therefrom through said material and said first packing including flexible portions exposed to fluid pressure in said space for exerting increased sealing pressure on co-operating sealing surfaces of said upper and said lower vessels in response to said fluid pressure.

2. Apparatus of the character described comprising an upwardly open kettle having a shoulder projecting inwardly from the upper peripheral edge thereof, a receptacle supported by said shoulder for holding material to be treated, a riser for conducting a steam and water mixture generated in said kettle to said receptacle, a collecting vessel, mechanical means for detachably connecting said vessel to said kettle, said vessel having a second riser communicating with said receptacle and extending upwardly from the bottom of said vessel, a first peripherally continuous packing between the shoulder on said kettle and the bottom of said vessel, a second peripherally continuous packing between the upper edge of said receptacle and the bottom of said vessel, said packings being radially spaced from each other and portions of said shoulder and of the bottom of said vessel radially between said packings being spaced from each other to provide between said portions of said shoulder and the bottom of said vessel an annular space and said space being in fluid pressure transmitting communication with the interior of said kettle, the inner periphery of said first packing being recessed to provide spaced flange portions engaging the confronting faces of the bottom of said vessel and the shoulder of said kettle respectively and adapted to be forced against said faces by fluid pressure generated in said kettle to maintain the desired seal between the parts.

3. Apparatus as defined in claim 2 in which said mechanical means comprises members interengaging primarily to prevent said vessel from being lifted from its assembled position on said kettle by fluid pressure generated in the latter.

4. Apparatus as defined in claim 3 in which said mechanical means comprises an inwardly extending projection on the kettle above said shoulder, a rim around the bottom of said vessel adapted to engage under said projection and a snap spring carried by said kettle opposite said projection for engaging over said rim.

5. Apparatus as defined in claim 3 in which said mechanical means comprises peripherally interrupted projections extending inwardly from the kettle above said shoulder and peripherally interrupted projections extending from the base of said vessel and adapted to be inserted between and to be engaged under the projections on the kettle by relative turning movement between the two parts.

References Cited in the file of this patent

UNITED STATES PATENTS

| Number | Name | Date |
| --- | --- | --- |
| 1,171,022 | Giletti | Feb. 8, 1916 |
| 2,483,297 | Naylor | Sept. 27, 1949 |
| 2,577,985 | Willman | Dec. 11, 1951 |

FOREIGN PATENTS

| Number | Country | Date |
| --- | --- | --- |
| 251,935 | Italy | Feb. 11, 1927 |
| 443,477 | Italy | Dec. 22, 1948 |